US011747836B2

(12) United States Patent
Belair

(10) Patent No.: US 11,747,836 B2
(45) Date of Patent: Sep. 5, 2023

(54) THERMOSTATIC CARTRIDGE

(71) Applicant: VERNET, Ollainville (FR)

(72) Inventor: Axel Belair, Bruyeres-le-Châtel (FR)

(73) Assignee: VERNET, Ollainville (FR)

( * ) Notice: Subject to any disclaimer, the term of this patent is extended or adjusted under 35 U.S.C. 154(b) by 178 days.

(21) Appl. No.: 17/441,124

(22) PCT Filed: Mar. 24, 2020

(86) PCT No.: PCT/EP2020/058161
§ 371 (c)(1),
(2) Date: Sep. 20, 2021

(87) PCT Pub. No.: WO2020/193552
PCT Pub. Date: Oct. 1, 2020

(65) Prior Publication Data
US 2022/0163985 A1    May 26, 2022

(30) Foreign Application Priority Data

Mar. 25, 2019 (FR) ..................................... 1903085

(51) Int. Cl.
*G05D 23/13* (2006.01)
(52) U.S. Cl.
CPC ................ *G05D 23/1353* (2013.01)
(58) Field of Classification Search
CPC .. G05D 23/13; G05D 23/1306; G05D 23/132; G05D 23/134; G05D 23/1346; G05D 23/1353
See application file for complete search history.

(56) References Cited

U.S. PATENT DOCUMENTS 9,823,671 B2   11/2017   Draber et al.
10,642,290 B2   5/2020   Jager
(Continued)

FOREIGN PATENT DOCUMENTS

FR    2686960 A1 *  8/1993   .............. F16B 21/18
FR    2932678 A1    12/2009
(Continued)

OTHER PUBLICATIONS

Search Report for International Patent Application No. PCT/EP2020/058161 dated Jun. 12, 2020.
(Continued)

*Primary Examiner* — Jonathan Bradford
(74) *Attorney, Agent, or Firm* — Pearne & Gordon LLP

(57) ABSTRACT

This cartridge comprises a housing, a base, attached to the housing and enclosing a chamber for mixing a cold fluid and a hot fluid, a thermostatic control system, arranged in the chamber and capable of controlling the temperature of the mixture leaving the chamber to a setpoint temperature, and a flow rate adjustment system, suitable for adjusting the flow rate of the mixture from outside the housing. This adjustment system comprises both a control member, which is able to move at least partially inside the housing in such a way as to vary the flow rates of cold fluid and hot fluid supplying the chamber, and an adjustment ring, which is arranged outside the housing and is centred on an axis (X-X) around which this ring is able to rotate relative to the housing, the ring being connected, through the housing, to the control member, by a connecting member.

11 Claims, 6 Drawing Sheets

(56) References Cited

U.S. PATENT DOCUMENTS

| 10,671,101 B2 | 6/2020 | Jager et al. |
| 2016/0011606 A1 | 1/2016 | Draber et al. |
| 2018/0196450 A1 | 7/2018 | Jager |
| 2019/0050006 A1 | 2/2019 | Jager et al. |

FOREIGN PATENT DOCUMENTS

| KR | 20070015947 A | 2/2007 | |
| WO | WO-2010028790 A2 * | 3/2010 | ......... G05D 23/1353 |
| WO | 2014135614 A2 | 9/2014 | |
| WO | 2017005860 A1 | 1/2017 | |
| WO | 2017137368 A1 | 8/2017 | |
| WO | 2019072772 A1 | 4/2019 | |

OTHER PUBLICATIONS

Search Report for French Application for FR 1903085 dated Oct. 1, 2019.

* cited by examiner

THERMOSTATIC CARTRIDGE

The present invention relates to a thermostatic cartridge.

In the field of fluid control, a cartridge is a device for controlling the mixing of a cold and a hot fluid, in particular cold and hot water in the sanitary field.

The cartridge is classified as thermostatic when it integrates a thermostatic regulation system, allowing the temperature of the mixture of cold and hot fluids to be regulated at a set temperature. Such a thermostatic control system comprises a thermostatic actuator such as a thermostatic element, for example, which includes a first part, normally fixed relative to a hollow base of the cartridge, and a second part, movable along an axis of the cartridge relative to the first part under the effect of the temperature applied to the actuator, under the action of the expansion of a thermodynamic material contained in a cup of the thermostatic element, for example. The second part of the thermostatic actuator is provided integral with a drawer that can be moved along the axis inside the base of the cartridge, so as to inversely vary the flow sections of the cold and hot fluids in the base, in order to mix these two fluids in variable proportions to obtain the mixture, otherwise called "mixed fluid", downstream of the drawer, which flows along a thermosensitive region of the thermostatic actuator and exits the base. By modifying the position of the first part of the thermostatic actuator relative to the base by means of an ad hoc setpoint mechanism, the setpoint temperature is varied, around which the temperature of the mixture is thus regulated for the drawer.

Furthermore, the cartridge incorporates a flow control system, allowing the flow rate of the mixture to be regulated. This flow rate adjustment system comprises a control member, such as a set of ceramic discs, which is mounted in an at least partially mobile manner in a cartridge housing fixed to the base. This control member affects the flow of hot fluid to the base and the flow of cold fluid to the base. By moving this control member, the latter is designed to vary both the flow of cold fluid sent to the base and the flow of hot fluid sent to the base. To drive the control member from outside the housing, several possibilities are possible. The invention is more specifically concerned with the case where the flow rate adjustment system comprises a adjustment ring outside of the housing, which is arranged coaxially with the cartridge and mounted so as to be rotatable about the cartridge axis relative to the housing: the rotation of this adjustment ring causes the control member to move via a connecting member linking this adjustment ring to the control member through the housing. In practice, this adjustment ring is typically independent of the above-mentioned setpoint mechanism, so that the cartridge allows the flow rate of the mixture and the temperature of the mixture to be controlled separately from each other, by means of the respective and independent actions of the adjustment ring and of the setpoint mechanism: the cartridge is then commonly referred to as a dual control cartridge. WO 2017/137368 discloses an example.

In existing cartridges, the adjustment ring is generally held on the housing by a dedicated part, such as a snap ring, which prevents the adjustment ring from being axially disengaged from the housing while allowing it to rotate about the axis. The presence and installation of this part impacts the manufacturing cost of the cartridge. Moreover, this part can generate resistance to the rotation of the adjustment ring. Furthermore, this part induces design constraints, in the sense that its presence must not interfere with an operating button that is generally attached and fixed to the ring once the cartridge is installed in a faucet, this operating button being intended to be manually operated by the end user of the faucet.

The object of the present invention is to provide an improved cartridge, the flow control of which can be provided in a reliable, efficient and economical manner.

To this end, the subject matter of the invention is a thermostatic cartridge, comprising:
  a housing,
  a base, which is attached to the housing and which encloses a chamber for mixing a cold fluid and a hot fluid, this chamber being connected to outside of the base by a first inlet for the cold fluid, by a second inlet for the hot fluid, and by an outlet for a mixture of the cold and hot fluids,
  a thermostatic control system, which is at least partially arranged in the chamber and which is adapted to control the temperature of the mixture to a set temperature, by inversely varying the respective flow sections of a first passage, provided between the first inlet and the chamber, and a second passage, provided between the second inlet and the chamber, and
  a flow control system, which is adapted to control the flow rate of the mixture from outside the housing and which comprises:
    a control member, which is arranged inside the housing so as to channel both the cold fluid sent to the first inlet and the hot fluid sent to the second inlet, and which is at least partially movable relative to the housing so as to vary both the flow rate of the cold fluid sent to the first inlet, and the flow rate of the hot fluid sent to the second inlet,
    an adjustment ring, which is arranged outside the housing and which is centered on an axis around which the adjustment ring is able to rotate relative to the housing, which adjustment ring has a first axial end and a second axial end, which are opposite to each other along the axis, the second axial end facing the control member, and which adjustment ring is provided with a slit, which connects the first and second axial end to each other and which has edges spaced apart from each other in a direction peripheral to the axis, the adjustment ring being deformable by relative spacing of the edges of the slit in said direction peripheral to the axis, and
    a connecting member, which connects the adjustment ring to the control member through the housing so that the rotation of the adjustment ring about the axis causes the control member to move.

Furthermore, the slit of the adjustment ring includes a notch which is adapted to receive a finger of the connecting member in a clamped manner along said direction peripheral to the axis when the adjustment ring is in an operational configuration.

One of the ideas behind the invention is to use an adjustment ring, within the system for adjusting the flow rate of the mixture obtained by the cartridge, which is slitted over its entire axial dimension and, therefore, deformable by means of the relative spacing of the edges of this slit. This deformability of the adjustment ring can advantageously be used to assemble the adjustment ring to the housing and then, if necessary, dispense with an additional part that would be attached to the cartridge to hold the adjustment ring axially to the housing. In all cases, the invention provides that a notch in the slit clamps a finger of the connecting member when the adjustment ring is in the operational configuration: in this way, the geometry of the adjustment ring is fixed when it is in the operational configuration, which allows good transmission of the rotary torque between the adjustment ring and the connecting member, contributes to the good rotational guidance of the adjustment ring on the casing, and makes the subsequent assembly between the adjustment ring and an attached operating button more reliable. Thanks to this adjusting ring, the flow rate adjustment system and, thereby, the thermostatic cartridge according to the invention are thus made viable, efficient and economical.

Moreover, other advantages and interests of this adjustment ring and, more generally, of the cartridge according to the invention will become apparent later on.

According to advantageous optional features of the thermostatic cartridge according to the invention:

- The adjustment ring is elastically deformable between a rest configuration, which the adjustment ring occupies in the absence of stress and in which the distance between the edges of the slit at the notch is less than the dimension of the finger, along the direction peripheral to the axis, and an assembly configuration, in which the distance between the edges of the slit at the notch is greater than the dimension of the finger, along the direction peripheral to the axis, and the adjustment ring passes through the operational configuration when deformed between the rest configuration and the assembly configuration.
- When the adjustment ring is in the operational configuration, the adjustment ring has a circular profile, in cross-section to the axis, centered on the axis.
- The adjustment ring is provided on an outer face thereof with reliefs adapted to transmit torque about the axis when the adjustment ring is in the operational configuration, these reliefs being intended to engage with an added operating button by complementary shapes.
- The notch opens axially onto the second axial end, and the finger extends parallel to the axis from inside to outside of the notch.
- The notch is connected to the remainder of the slit, axially opposite the opening of the notch at the second axial end, forming a stepped region against which the finger abuts axially.
- The housing comprises a bearing surface having an outer face, around which the adjustment ring in the operational configuration is mounted so as to be able to rotate around the axis, and against which an inner face of the adjustment ring in the operational configuration bears radially.
- The bearing surface is bordered by a shoulder whose outer diameter is greater than the diameter of the inner face of the adjustment ring in the operational configuration, so that the shoulder axially retains the adjustment ring in the operational configuration around the outer face of the bearing surface.
- The bearing surface comprises bearing elements, which are arranged on the outer face of the bearing surface, distributed in the direction peripheral to the axis and each projecting radially from the rest of the bearing surface, and the adjustment ring is provided with a cylindrical surface on the inner face thereof, which has a circular base, when the adjustment ring is in the operational configuration, being centered on the axis and rests radially against the support elements.
- The bearing surface also comprises a groove which is arranged on the outer surface of the bearing surface, running on this outer surface in the direction peripheral to the axis and being recessed relative to the rest of the bearing surface, and the adjustment ring is provided, on the inner face thereof, with a bulge which, when the adjustment ring is in the operational configuration, is complementary to the groove and snaps into this groove.
- The groove is flat bottomed.

The invention will be better understood from the following description, given only by way of example and made with reference to the drawings in which.

Figure 1:
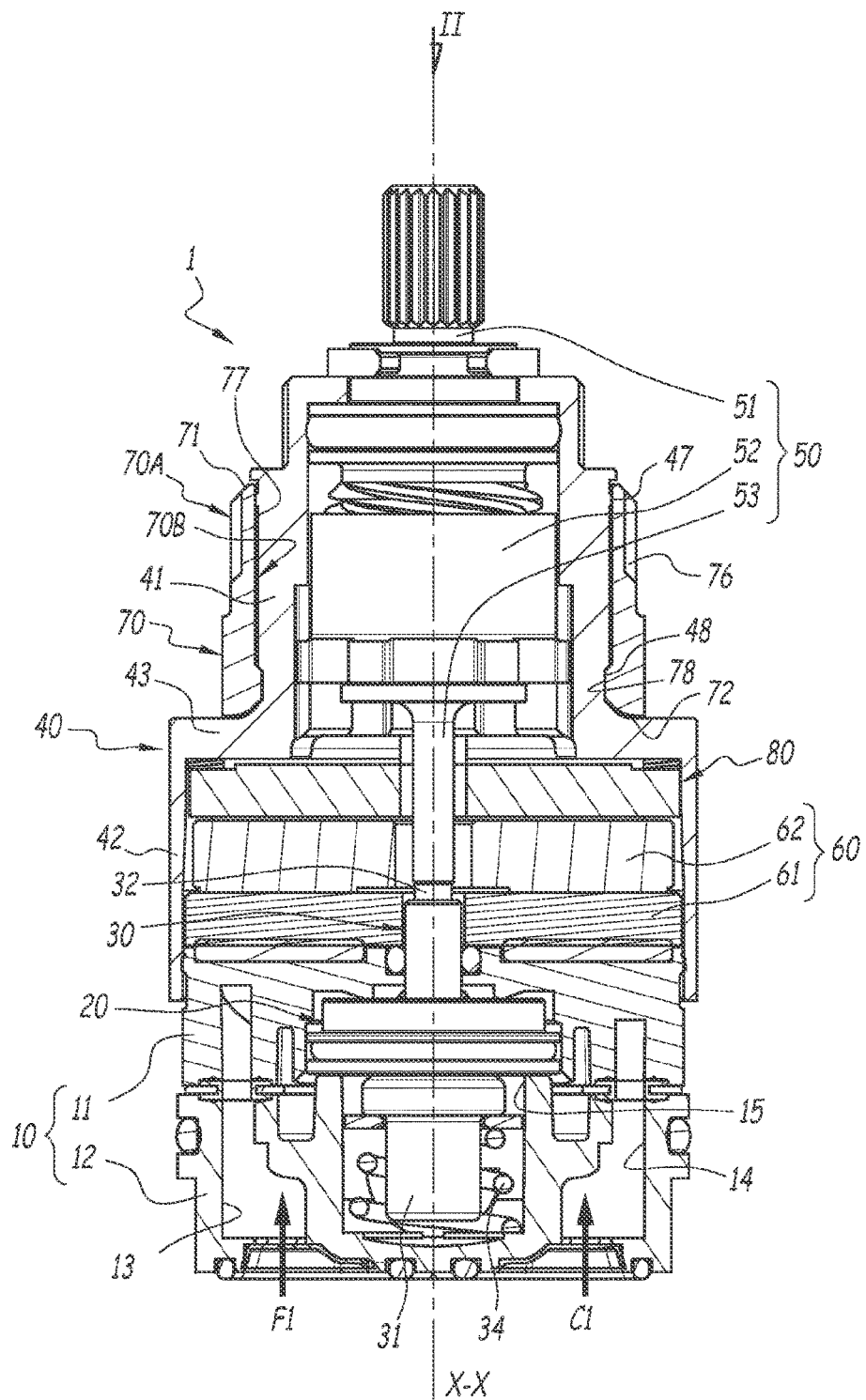
FIG. 1 is a longitudinal section of a thermostatic cartridge according to the invention.
Figure 2:
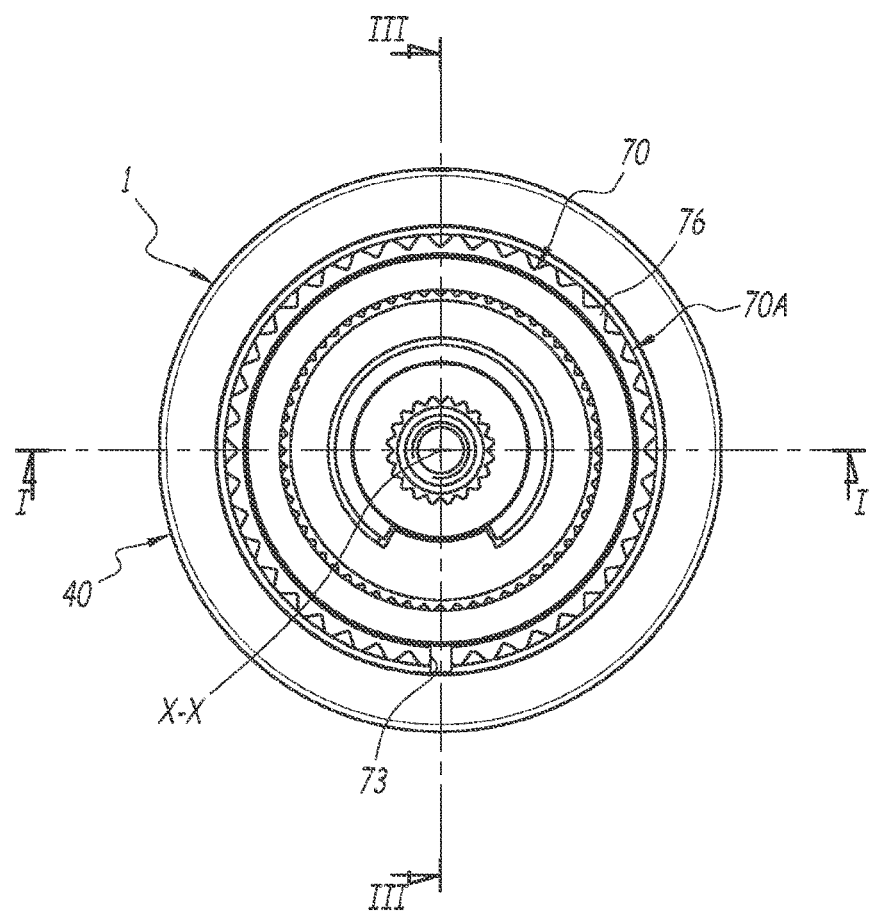
FIG. 2 is an elevated view according to arrow II of FIG. 1, the cross-sectional plane of FIG. 1 being marked by the line I-I in this FIG. 2.
Figure 3:
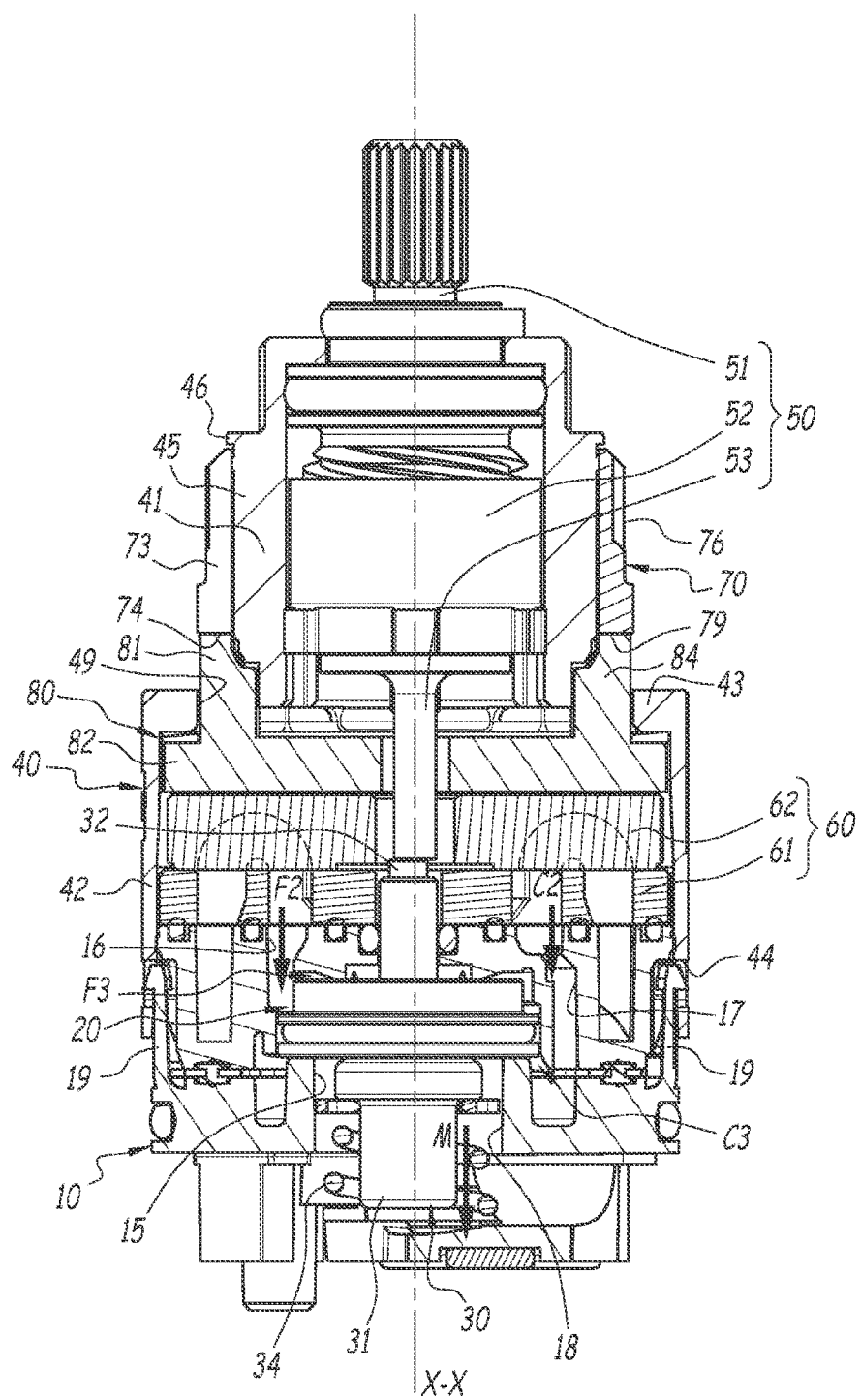
FIG. 3 is a cross-section according to the line III-III of FIG. 2.

A thermostatic cartridge 1 is shown in FIGS. 1 to 3. The cartridge 1 is adapted to equip a mixing valve supplied with hot and cold water, not shown as such in the figures. More generally, the cartridge 1 is adapted to equip a facility, such as a sanitary facility, delivering a fluid obtained by mixing a hot fluid and a cold fluid at the cartridge.

This cartridge 1 defines a geometric axis X-X, on which the cartridge is centered overall, and along which the cartridge is arranged.

For convenience, the remainder of the description is oriented relative to the X-X axis considering that the terms "upper", "top" and the like correspond to an axial direction facing the top of FIGS. 1 and 3, while the terms "lower", "bottom" and the like correspond to an opposite axial direction.

As is clearly visible in FIGS. 1 and 3, the cartridge 1 includes a base 10, having a generally cylindrical outer shape, centered on the X-X axis. In the exemplary embodiment considered here, the base 10 primarily includes a top portion 11 and a bottom portion 12, which are axially superimposed in a fixed manner on each other and which form a joining interface between them, at which the contact areas between the top 11 and bottom 12 portions are sealed, to prohibit the flow of fluids through these contact areas. Specific embodiments relating to these portions, 11 and 12, and their assembly are given in WO 2017/005860, WO 2017/137368 and WO 2019/072772, to which the reader may refer. In practice, embodiments other than those with two distinct superimposed portions, such as portions 11 and 12, are conceivable for the base 10, with this aspect not being limiting of the invention. Thus, in a variant not shown, the base 10 may be made differently, in one piece, or as in WO 2014/135614, for example.

The base 10 is provided with a cold-water circulation channel 13 between the bottom side and the top side of the base. Similarly, the base 10 is provided with a hot water circulation channel 14 between its bottom and top faces. Moreover, the base 10 contains a chamber 15 through which the X-X axis passes. In the example shown in the figures, this chamber 15 is centered on the X-X axis.

On either side of the chamber 15, the base 10 is provided with a cold water inlet 16 and a hot water inlet 17, which each open onto the upper face of the base 10 at their upper end, while these inlets 16 and 17 open into the chamber 15 at their lower end, the lower end of the inlet 17 being located axially lower than that of the inlet 16. Thus, the inlets 16 and 17 connect the chamber 15 to the exterior of the base 10, more specifically to the upper face of this base. In addition, the base 10 is provided with a mixing outlet 18 that opens into the chamber 15 at its upper end, while this outlet 18 opens onto the lower face of the base 10 at its lower end. The outlet 18 thus connects the chamber 15 to the outside of the base 10, more precisely to the lower face of the latter. In the example shown in the figures, the outlet 18 is substantially centered on the X-X axis.

When the cartridge 1 is used in a mixing valve or similar facility, the circulation channels 13 and 14 are respectively supplied with cold and hot water from the lower face of the base 10, as indicated by the arrows F1 and C1 in FIG. 1. After leaving the base 10 through the upper surface of the latter, then after having circulated inside the rest of the cartridge 1 as detailed below, this cold and hot water are returned to the upper surface of the base 10 so as to supply the inlets 16 and 17 respectively, as indicated by arrows F2 and C2 on FIG. 3. This cold and hot water, flowing downwards in the inlets 16 and 17 respectively, then feeds the chamber 15, in which they mix in the form of mixed water, hereinafter referred to as a mixture, which leaves the chamber 15 through the outlet 18, being discharged downwards, as indicated by the arrow M in FIG. 3.

The cartridge 1 also includes a drawer 20. This drawer 20 has a generally tubular shape, centered on an axis which is parallel or even coincident with the X-X axis, in the assembled state of the cartridge 1.

The drawer 20 is mounted on the base 10, more precisely inside the chamber 15, so as to be movable parallel to the axis X-X between two extreme positions, namely:
an upper extreme position, in which the upper face of the drawer 20 rests against a high position, which is fixed relative to the base 10, and
a lower extreme position, in which the lower face of the drawer 20 rests against a low position, which is fixed relative to the base 10.

The total axial dimension of the drawer 20 separating its upper and lower faces from each other is smaller than the axial distance separating the aforementioned upper and lower positions from each other. Therefore, when the drawer 20 is in its extreme lower position, the drawer closes a hot water inlet inside the chamber 15 by pressing the drawer against the lower position, while opening a cold water passage F3 at most, which is axially delimited between the drawer and the upper position and which lets the cold water pass from the inlet 16 to the chamber 15. Conversely, when the drawer 20 is in its extreme upper position, the drawer 20 closes a cold water inlet inside the chamber 15 by pressing the drawer against the upper position while opening a hot water passage C3 at most, which is axially delimited between the drawer and the lower position and which lets hot water pass from the inlet 17 to the chamber 15. In use, the passage F3 is supplied with cold water by the inlet 16 and the passage C3 is supplied with hot water by the inlet 17: according to the axial position of the drawer 20 between its extreme high and low positions, the respective flow sections of the cold water passage F3 and of the hot water passage C3 vary inversely, which amounts to saying that the cold water and hot water quantities admitted in the chamber 15 are respectively regulated in inverse proportions by the drawer 20 based on its axial position In practice, to ensure the guiding of the mobile assembly of the drawer 20 in the chamber 15, the lateral face of this drawer is received in a fitted and sealed manner inside a complementary surface of the chamber 15, with the interposition of at least one seal to prevent any mixing between the cold and hot water upstream of the drawer. Moreover, in order that the cold water admitted into the chamber 15 from the inlet 16 can join and mix with the hot water admitted into this chamber from the inlet 17, thus forming the aforementioned mixture flowing downstream of the drawer to the outlet 18, the drawer 20 internally delimits one or more flow passages, which connect its upper and lower faces to each other. The embodiment of the arrangements described in this paragraph is not limiting of the invention.

In order to make the drawer 20 move axially and thus control its axial position relative to the base 10, the cartridge 1 contains a thermostatic element 30 comprising a body 31 and a piston 32. The body 31 contains a thermo-expandable material that causes the piston 32 to move in translation, by expansion. The body 31 and the piston 32 are centered on the corresponding translation axis, this translation axis being parallel or even coincident with the X-X axis in the assembled state of the cartridge 1. Also, in the assembled state of the cartridge, the body 31 is fixedly attached to the drawer 20 by any suitable means, so that at least a part of the body 31 is arranged in the chamber 15 and the thermally expandable material that this body 31 contains can be sensitized by the heat of the mixture flowing downstream of the drawer 20 along the body 31.

The thermostatic element 30 is further related to a compressed return spring 34, which acts on the body 31 and thus on the drawer 20 integral with this body 31, in a manner opposite to the deployment of the piston 32 out of the body 31 resulting from an expansion of the thermally expandable material. The return spring 34 is axially interposed between the base 10 and the drawer 20. In the example embodiment considered here, the return spring 34 is thus interposed between the lower part 12 of the base 10 and the body 31 of the thermostatic element 30. Upon contraction of the thermally expandable material, the spring 34 partially relaxes and returns the piston 32 to inside the body 31.

In the assembled state of the cartridge 1, the position of the piston 32 along the X-X axis relative to the base 10 defines a set temperature, which corresponds to a regulation position for the drawer 20 inside the chamber 15: the drawer regulates the quantities of hot and cold water flowing through the passages C3 and F3, adjusting its effective position around this regulation position by means of its drive by the body 31 relative to the piston 32, so that the temperature of the resulting mixture is regulated around the aforementioned setpoint temperature.

More generally, it is understood that the assembly comprising the drawer 20, the thermostatic element 30 and the return spring 34 constitute a possible embodiment of a thermostatic control system, which is at least partially arranged in the chamber 15 and which is adapted to regulate the temperature of the mixture at a set temperature by inversely varying the respective flow sections of the passages C3 and F3. Other embodiments of this thermostatic control system than the one detailed so far are conceivable. In other words, the embodiment of this thermostatic control system is not limiting of the invention.

Figure 4:
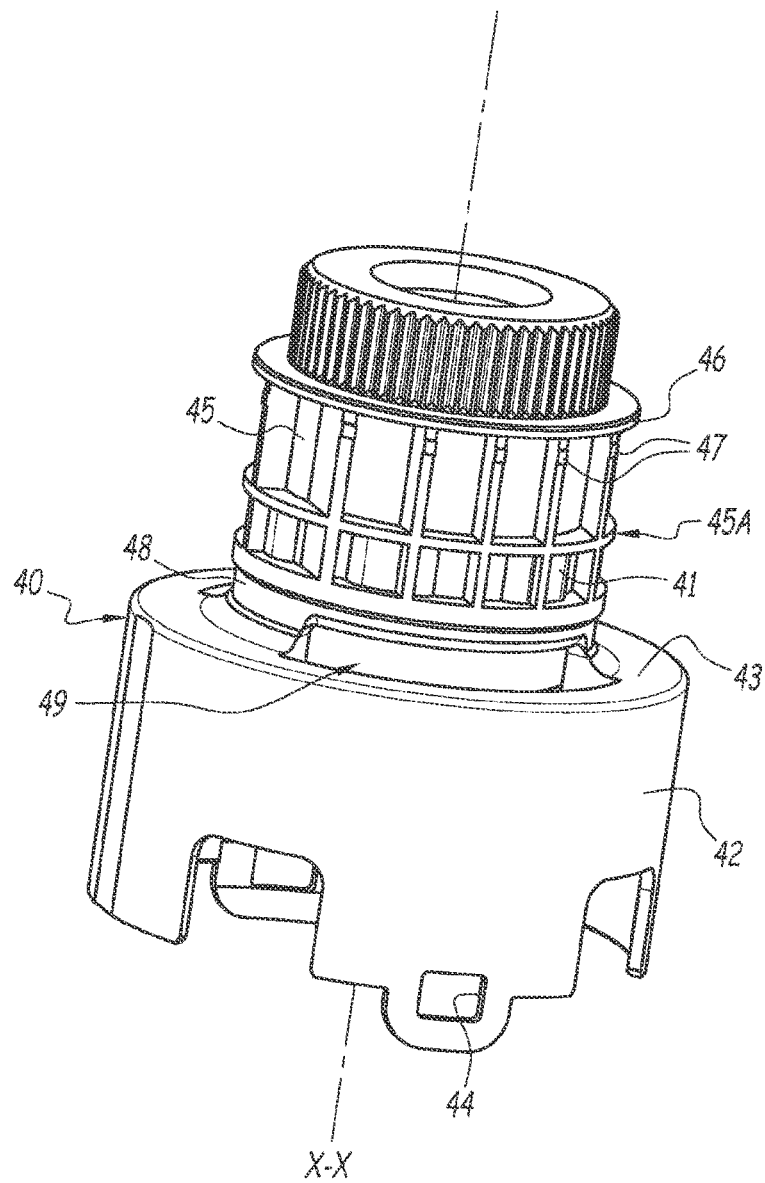
FIG. 4 is a perspective view of a component of the cartridge of FIG. 1, shown alone.

The cartridge 1 also includes a casing 40, which is shown alone in FIG. 4. As is clearly visible in FIGS. 1, 3 and 4, the casing 40 is generally tubular in shape, centered on a geometric axis, which is substantially coincident with the X-X axis in the assembled state of the cartridge 1. In the embodiment considered here, the casing 40 includes a top portion 41, which has a tubular shape centered on the axis X-X, and a bottom portion 42, which also has a tubular shape centered on the axis X-X but whose inner and outer diameters are respectively greater than the inner and outer diameters of the top portion 41. The upper portion 41 and the lower portion 42 are connected to each other by a shouldered part 43 of the casing 40.

Regardless of the embodiment, the casing 40 is fixedly attached to the base 10, in the assembled state of the cartridge 1. The respective arrangements of the casing 40 and the base 10, allowing them to be fixed relatively, are not limiting of the invention: these respective arrangements may interact by complementary shapes for example, in particular by interlocking, clipping, adjustment, etc. In the example of the embodiment considered in the figures, the tabs 19 of the base 10 interact by snap-fitting with housings 44 delimited by the lower portion 42 of the casing 40. Specific features of this embodiment are detailed in WO 2019/072772. Whatever the embodiment of the aforementioned arrangements, the latter are adapted, by their design, to position the casing 40 in a predetermined manner relative to the base 10, in particular relative to the axis X-X, both in the direction of this axis and transversely to this axis and angularly about this axis.

According to an advantageous optional arrangement that is implemented in the exemplary embodiment considered in the figures, the cartridge 1 comprises a setpoint mechanism 50 for controlling the aforementioned setpoint temperature from outside the casing 40 and thereby adjusting the temperature of the mixture. In the embodiment considered in the figures, the set point mechanism 50 comprises an adjustment rod 51 that is centered on the axis X-X, in the assembled state of the cartridge 1, and extends axially from the outside to the inside of the casing 40, passing through the top of the top portion 41. This adjustment rod 51 is locked in translation along the X-X axis relative to the casing 40, while being mobile in rotation about the X-X axis. The setting mechanism 50 also comprises a nut 52 that is centered on the axis X-X, in the assembled state of the cartridge, 1, and is housed inside the casing 40, in particular inside its upper portion 41. This nut 52 is locked in rotation about the axis X-X relative to the casing 40, while being movable in translation along this axis. A threaded part of the adjustment rod 51, arranged inside the casing 40, is screwed into a threaded part of the nut 52, thus forming a screw/nut connection between the adjustment rod 51 and the nut 52. Thus, by driving the adjustment rod 51 in rotation about the axis X-X, typically by stressing the part of this adjustment rod, located outside the casing 40, the nut 52 is driven in translation along the axis X-X inside the casing 40. This axial translation of the nut 52 is transmitted to the piston 32 of the thermostatic element 30 by a connecting rod 53, for example. This connecting rod 53 extends in the upward axial extension of the piston 32 so that the piston 32 is pressed axially against the lower end of this connecting rod 53 under the upward thrust of the return spring 34, on the one hand, and, under normal operating conditions of the cartridge 1, the upper end of the connecting rod 53 is rigidly connected to the nut 52, on the other hand. It is understood that under normal operating conditions, the set point mechanism 50 determines the axial altitude of the piston 32 relative to the casing 40 and to the base 10 regardless of the relative position of this piston 32 relative to the body 31 of the thermostatic element 30. The connection between the nut 52 and the connecting rod 53 can advantageously incorporate overtravel arrangements allowing to accommodate an overtravel of the piston 32 without damaging the drawer 20 or the thermostatic element 30. Specific features relating to these overtravel arrangements and, more generally, complementary or alternative arrangements to the set point mechanism 50 presented thus far, are detailed in WO 2017/137368 and in EP 1 241 385.

As is clearly visible in FIGS. 1 and 3, the cartridge 1 also comprises a control member 60 that is arranged inside the casing 40, in particular inside the lower portion 42 of this housing. This control member 60 allows the cold water coming out of the channel 13 to be channeled to the inlet 16, inside the casing 40, on the one hand, and the hot water coming out of the channel 14 to be channeled to the inlet 17 on the other hand, while controlling the cold water flow rate sent to the inlet 16 and the hot water flow rate sent to the inlet 17 in an adjustable manner. In the embodiment considered in the figures, the control member 60 consists of axially superimposed ceramic disks, namely a lower disk 61, which is fixed relative to the casing 40, and an upper disk 62, which is rotatable about the axis X-X relative to the casing 40. As can be seen in FIG. 3, the lower disk 61 is traversed by ascents and descents for hot and cold water respectively, while the lower face of the upper disk 62 is hollowed out, to connect the ascents and descents of cold water and to connect the ascents and descents of hot water, so that by modifying the relative positioning of the disks 61 and 62, the flow rate of cold water and the flow rate of hot water exiting downwardly from the lower disk 61 can be varied in a controlled manner. Other embodiments than the example consisting of the disks 61 and 62 are conceivable for the control member 60. For example, WO 2010/072966 proposes an alternative embodiment. More generally, any embodiment can be envisaged for the control member 60, whether with disks or other elements, as long as the latter is mounted inside the casing 40 in an at least partially mobile manner in order to channel and vary the flow of the cold fluid sent to the inlet 16 and to channel and vary the flow of the hot fluid sent to the inlet 17. Because of its action on the flow rates of cold and hot water sent to the inlets 16 and 17 of the base 10, the control member 60 makes it possible to control, the flow rate of the mixture inside the casing 40.

In order to be able to move the control member 60 from outside of the casing 40, the cartridge 1 includes an adjustment ring 70. This adjustment ring 70 is centered on a geometric axis, which is coincident with the X-X axis in the assembled state of the cartridge 1. As is clearly visible in FIGS. 1, 2 and 3, the adjustment ring 70 is arranged outside the casing 40, in the assembled state of the cartridge 1, and is mounted on the latter, in particular on the upper portion 41 of the casing 40, in a rotatable manner about the axis X-X relative to the housing. In addition, the adjustment ring 70 is connected through the casing 40, in particular through the shoulder portion 43 thereof, to the control member 60 by a connecting member 80, so that rotation of the adjustment ring about the axis X-X causes the member 60 to move. The adjustment ring 70 and the connecting member 80 are shown alone and assembled to each other in FIG. 5, and are shown assembled to the casing 40 in FIG. 6.

Before describing the adjustment ring 70 and connecting member 80 in more detail below, it will be noted that the control member 60, adjustment ring 70, and connecting member 80 together form a flow control system for the cartridge 1, which allows the flow rate of the mixture to be adjusted from outside of the casing 40.

As is clearly visible in FIGS. 1-3, 5 and 6, the adjustment ring 70 has a generally tubular shape, centered on the X-X axis. The adjustment ring 70 thus includes two opposite axial ends, namely a top end 71 and a bottom end 72. Further, the adjustment ring 70 thus includes an outer face 70A and an inner face 70B, which are separated from each other by the thickness, in other words the radial dimension, of the adjustment ring 70.

Figure 5:
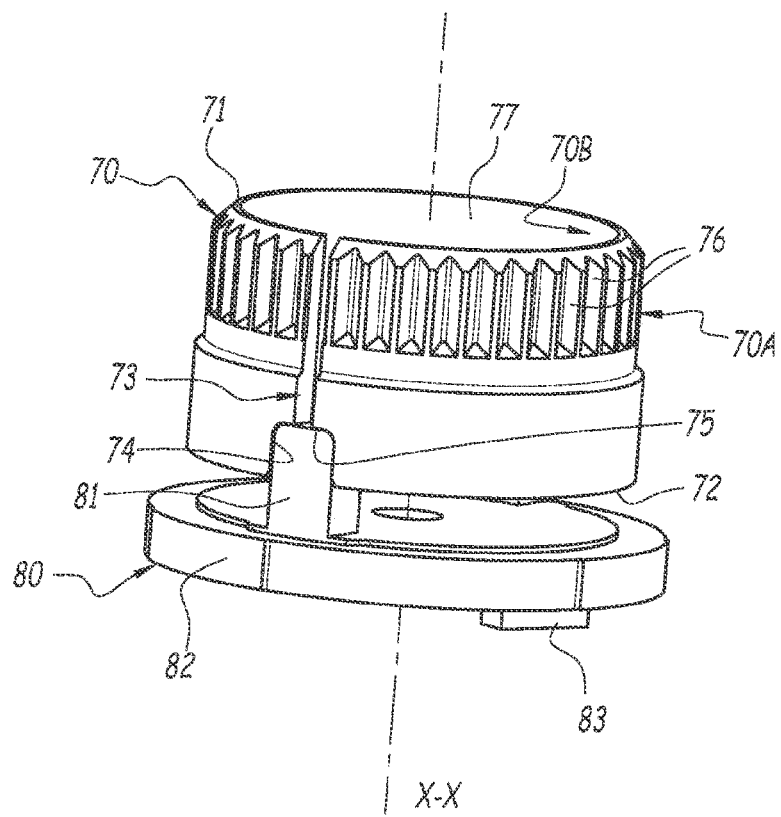
FIG. 5 is a perspective view of two other components of the cartridge of FIG. 1, shown alone and assembled together.
Figure 6:
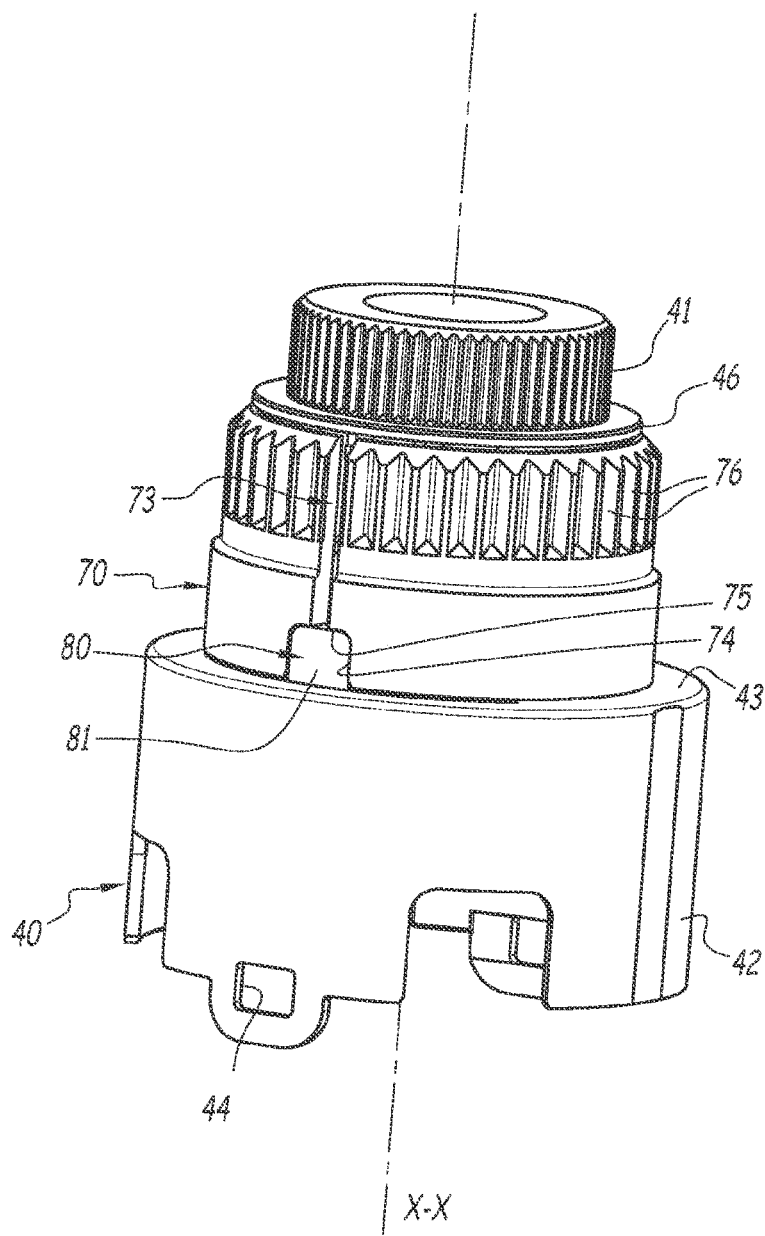
FIG. 6 is a perspective view of the components of FIGS. 4 and 5, assembled to each other.

As is clearly visible in FIGS. 3, 5 and 6, the adjustment ring 70 is provided with a slit 73, connecting the upper 71 and lower 72 ends to each other. The slit 73 has edges, spaced apart from each other, along a direction peripheral to the X-X axis. The adjustment ring 70 is designed to allow the relative spacing of the edges of its slit 73 along the direction peripheral to the X-X axis, whereby these edges can be selectively moved toward each other or away from each other by varying the dimension of the slit 73 correspondingly, along the direction peripheral to the X-X axis. For this purpose, the adjustment ring 70 is deformable in the direction peripheral to the X-X axis, the material and/or thickness of the adjustment ring being provided accordingly.

As is clearly visible in FIGS. 5 and 6, the slit 73 includes a notch 74 which, in the assembled state of the cartridge 1, receives a specific part of the connecting member 80, namely a finger 81 of this connecting member. In the example embodiment considered in the figures, the notch 74 has a dimension, along the direction peripheral to the X-X axis, which is greater than that of the rest of the slit 73. This arrangement allows for dimensional adaptation between the finger 81 and the region of the slit 73 intended to receive this finger 81, without imposing the same dimensioning over the entire axial extent of the slit 73. That said, in a variant not shown, the peripheral dimension of slit 73 may be provided constant over the entire axial extent of adjustment ring 70, in particular without dimensional variation at the notch 74.

In any case, the notch 74 is provided, when the adjustment ring 70 is in a operational configuration that this adjustment ring has in the assembled state of the cartridge 1, specifically dimensioned to receive the finger 81 in a clamped manner along the direction peripheral to the axis X-X. In practice, the intensity of this clamping is not limiting, as long as this clamping takes up all clearance along the direction peripheral to the X-X axis, between the finger 81 and the adjustment ring 70. Thus, the intensity of this clamping can be almost zero, if necessary, provided the slit 74 and the finger 81 are adjusted to each other in the direction peripheral to the axis X-X when the adjustment ring 70 is in the operational configuration.

In this operational configuration, it will be noted that the adjustment ring 70 has a circular profile, in cross-section to the axis, centered on the axis X-X, both for its outer face 70A and for its inner face 70B, as clearly visible in FIG. 2. The advantages of this advantageous arrangement will become apparent later on.

The clamping of the finger 81 made by the notch 74 when the adjustment ring 70 is in its operational configuration may result from various arrangements, which are not limiting of the invention. According to a particularly advantageous embodiment, this clamping results from an elastic deformation capacity of the adjustment ring 70. More specifically, the adjustment ring 70 is then provided, elastically deformable, between a rest configuration and an assembly configuration, passing through the operational configuration. As the name implies, the rest configuration is occupied by the adjustment ring 70 when the adjustment ring 70 is at rest, in other words, when no stress is applied to the adjustment ring. In this rest configuration, it is intended that the distance between the edges of the slit 73 at the notch 74 of the latter is less than the dimension of the finger 81, along the direction peripheral to the X-X axis. In contrast, in the assembly configuration, it is provided that the distance between the edges of the slit 73 at its notch 74 is greater than the dimension of the finger 81, along the direction peripheral to the X-X axis. When assembling the adjustment ring 70 to the rest of the cartridge 1, in particular to the connecting member 80, the adjustment ring 70 is elastically deformed, from its rest configuration to its assembly configuration, by applying stresses tending to move the edges of the slit 73 away from each other, then, once the finger 81 is positioned inside the notch 74, the aforementioned constraints are released, inducing the passage of the latter from its assembly configuration to its operational configuration by the elastic return of the adjustment ring 70, with the edges of the slit 74 moving closer together until these edges clamp the finger 81 in the direction peripheral to the axis X-X.

According to a practical embodiment, which is implemented in the example considered in the figures, the notch 74 is located in the lower part of the slit 73, more precisely opening axially on the lower end 72 of the adjustment ring 70. The notch 74 can then axially receive the finger 81 in the assembled state of the cartridge 1, as clearly visible in FIGS. 3, 5 and 6: in the assembled state of the cartridge 1, the finger 81 then extends parallel to the axis X-X, from the inside to the outside of the notch 74. In other words, a top portion of the finger 81 is then housed inside the notch 74, this top portion of the finger 81 being moreover clamped along the direction of the peripheral to the axis X-X by the edges of the slit 73 of the adjustment ring 70 in the operational configuration, while a bottom portion of the finger 81 is found below and outside the notch 74, this bottom portion extending the aforementioned top portion of the finger axially downwards. This makes it easier to implement the assembly between the adjustment ring 70 and the connecting member 80, while guaranteeing a reliable assembly result. These advantages are reinforced by the fact that the notch 74 is connected to the rest of the slit 73 at the upper end of the notch 74, i.e. axially opposite the lower opening of the notch, forming a shouldered region 75 against which the finger 81 is axially abutted upwards when the cartridge 1 is assembled.

On its outer face 70A, the adjustment ring 70 is provided with reliefs 76, which form grooves in the example embodiment considered in the figures. The shape of these reliefs 76 is not limiting provided that these reliefs allow a driving torque to be transmitted around the axis X-X, when the adjustment ring 70 is in the operational configuration. In fact, these reliefs 76 are intended to engage by complementarity of shapes with a maneuvering knob, which is not shown in the figures and which is attached to the cartridge 1 to allow a user of the latter to easily drive the adjustment ring 70 in rotation. It is understood that the connection between this operating knob and the adjustment ring 70 depends on good complementarity of shapes between the reliefs 76 and the operating knob, which requires that the reliefs 76 have a precise geometry specifically adapted to the operating knob, despite the deformability of the adjustment ring 70. This precise geometry is effectively obtained as soon as the adjustment ring 70 is in the operational configuration, due to the clamping in the notch 74 of the finger 81, which is dimensioned accordingly along the direction of periphery to the axis X-X. In other words, the notch 74 and the finger 81 are calibrated along the direction of peripheral to the X-X axis, which finely controls the geometry presented by the reliefs 76 when the adjustment ring is in the operational configuration. In this context, it is understood that the outer profile, which the adjustment ring 70 presents in cross section to the axis X-X in the operational configuration, is circular.

For its part, the inner face 70B of the adjustment ring 70 ensures the rotary mounting of the adjustment ring 70 on the casing 40 about the axis X-X, in particular on the upper portion 41 of this housing. According to advantageous arrangements, the upper portion 41 of the casing 40 includes a bearing surface 45 having an outer face 45A, around which the adjustment ring 70 is mounted, in the operational configuration, so as to rotate about the axis X-X, and against which the inner face 70B of this ring bears radially to the axis X-X.

At its upper end, the bearing surface 45 is advantageously bordered by a shoulder 46, provided for axially retaining the adjustment ring 70 in the operational configuration about the outer face 45A. To this end, the shoulder 46 has an outside diameter that is greater than the diameter of the inner face 70B of the adjustment ring 70 in the operational configuration, as clearly visible in FIGS. 1 to 3. Thus, in the assembled state of the cartridge 1, the shoulder 46 prevents upward axial disengagement of the adjustment ring 70 as long as the adjustment ring 70 remains in its operational configuration. To allow for assembly of the adjustment ring 70 around the outer face 45A of the bearing surface 45, the adjustment ring 70 must be deformed until the diameter of its inner face 70B becomes greater than the outer diameter of the shoulder 46, by spacing the edges of its slit 73. In a variant not shown, the shoulder 46 is replaced by an insert, such as a snap ring, dedicated to retaining the adjustment ring 70 around the bearing surface 45.

In order to precisely control the diameter of the outer face 45A on which the inner face 70B of the adjustment ring 70 in the operational configuration is centered and rotates about the axis X-X, the bearing surface 45 advantageously comprises bearing elements 47 that are arranged on the outer face 45A, as is clearly visible in FIG. 4, distributed along the peripheral direction to the axis X-X on the one hand, with each projecting radially from the rest of the bearing surface 45 on the other hand. In the assembled state of the cartridge 1, the inner face 70B of the adjustment ring 70 in the operational configuration is radially supported against these support elements 47: more precisely, this inner face 70B includes a cylindrical surface 77, which cooperates in radial support with the support elements 47 and which, when the adjustment ring 70 is in the operational configuration, has a circular base and is centered on the axis X-X. In this context, it is understood that the inner profile, which the adjustment ring 70 has in cross-section to the axis X-X in the operational configuration, is circular.

Furthermore, in particular in order to axially wedge the adjustment ring 70 on the bearing surface 45 while ensuring good rotational guidance without too much friction, the bearing surface 45 advantageously comprises a groove 48 that is arranged on the outer face 45A, as can be clearly seen in FIG. 4, running on the latter in the direction peripheral to the axis X-X and being recessed relative to the rest of the bearing surface 45. As is clearly visible in FIGS. 1 and 3, the adjustment ring 70 is then provided, on its inner face 70B, with a bulge 78 that is complementary to the groove 48 when the adjustment ring 70 is in the operational configuration and which, in the assembled state of the cartridge 1, snaps into this groove 48. The rotational guidance of the adjustment ring 70 on the bearing surface 45 can be further improved by providing that the groove 48 is flat-bottomed, as in the exemplary embodiment considered in the figure.

Apart from the finger 81, the embodiment of the connecting member 80 is not limiting, provided that as the connecting member 80 connects the adjustment ring 70 to the control member 60 through the casing 40, as previously indicated. In the examplary embodiment shown in the figures, the connecting member 80 comprises a discoidal body 82 from which the finger 81 extends axially upwards, as clearly visible in FIG. 5. In the assembled state of the thermostatic cartridge 1, the discoidal body 82 is arranged inside the casing 40 and overlaps the upper disc 62 of the control member 60, being connected to the latter kinematically by ad hoc arrangements, such as one or more tabs 83 that extend axially downwards from the discoidal body 82 and are axially received in complementary housings of the upper disc 62. At the same time, the finger 81 passes axially through the shouldered part 43 of the casing 40, via a through groove 49, which is clearly visible in FIGS. 3 and 4 and which extends in the direction peripheral to the axis X-X, to allow the finger 81 to move in this peripheral direction during the rotary movements of the adjustment ring 70

Finally, various arrangements and variants of the cartridge 1 described so far are also conceivable. By way of example:
- to reinforce the assembly connection between the adjustment ring 70 in the operational configuration and the connecting member 80, the latter may include another finger 84 in addition to the finger 81 clamped by the notch 74, visible in FIG. 3 and diametrically opposite the finger 81, about the axis X-X; in the assembled state of the cartridge 1, this finger 84 is received in a complementary housing 79 of the adjustment ring 70, this housing 79 not being included in a slit similar to the slit 73, i.e. extending over the entire axial extent of the adjustment ring 70; and/or
- within the thermostatic control system, the thermostatic element 30 can be replaced by a temperature-dependent shape memory element, in particular a shape memory spring; more generally, such a shape memory element and the thermostatic element 30 are only possible embodiments for a thermostatic actuator, which performs the function of moving the drawer 20 inside the chamber 15 as a function of temperature and a dedicated part of which defines, by its axial position, the setpoint temperature at which the drawer 20 controls the temperature of the mixture.

The invention claimed is:

1. A thermostatic cartridge, comprising:
   a housing,
   a base, which is attached to the housing and which encloses a chamber for mixing a cold fluid and a hot fluid, this chamber being connected to outside of the base by a first inlet (16) for the cold fluid, by a second inlet for the hot fluid, and by an outlet for a mixture of the cold and hot fluids,
   a thermostatic control system, which is at least partially arranged in the chamber and which is adapted to control the temperature of the mixture to a set temperature, by inversely varying respective flow sections of a first passage, provided between the first inlet and the chamber, and of a second passage, provided between the second inlet and the chamber, and
   a flow control system, which is adapted to control a flow rate of the mixture from outside the housing and which comprises:
      a control member, which is arranged inside the housing so as to channel both the cold fluid sent to the first inlet and the hot fluid sent to the second inlet, and which is at least partially movable relative to the housing so as to vary both a flow rate of the cold fluid sent to the first inlet, and a flow rate of the hot fluid sent to the second inlet, an adjustment ring, which is arranged outside the housing and which is centered on an axis around which the adjustment ring is able to rotate relative to the housing, which adjustment ring has a first axial end and a second axial end, which are opposite to each other along the axis, the second axial end facing the control member, and which adjustment ring is provided with a slit, which connects the first and second axial ends to each other and which has edges spaced apart from each other in a direction peripheral to the axis, the adjustment ring being deformable by relative spacing of the edges of the slit in said direction peripheral to the axis, and a connecting member, which connects the adjustment ring to the control member through the housing so that the rotation of the adjustment ring about the axis causes the control member to move, and wherein the slit of the adjustment ring includes a notch which is adapted to receive a finger of the connecting member in a clamped manner along said direction peripheral to the axis when the adjustment ring is in an operational configuration.

2. The thermostatic cartridge according to claim 1, wherein the adjustment ring is elastically deformable between:

a rest configuration, which the adjustment ring occupies in the absence of stress and in which a distance between the edges of the slit at the notch is less than a dimension of the finger, along the direction peripheral to the axis, and an assembly configuration, in which the distance between the edges of the slit at the notch is greater than the dimension of the finger, along the direction peripheral to the axis, and wherein the adjustment ring passes through the operational configuration when deformed between the rest configuration and the assembly configuration.

3. The thermostatic cartridge according to claim 1, wherein, when the adjustment ring is in the operational configuration, the adjustment ring has a circular profile, in cross-section to the axis, centered on the axis.

4. The thermostatic cartridge according to claim 1, wherein the adjustment ring is provided on an outer face thereof with reliefs adapted to transmit torque about the axis when the adjustment ring is in the operational configuration, these reliefs being intended to engage with an added operating button by complementary shapes.

5. The thermostatic cartridge according to claim 1, wherein the notch opens axially onto the second axial end, and wherein the finger extends parallel to the axis from inside to outside of the notch.

6. The thermostatic cartridge according to claim 5, wherein the notch is connected to the remainder of the slit, axially opposite an opening of the notch at the second axial end, forming a stepped region against which the finger abuts axially.

7. The thermostatic cartridge according to claim 1, wherein the housing comprises a bearing surface having an outer face, around which the adjustment ring in the operational configuration is mounted so as to be able to rotate around the axis, and against which an inner face of the adjustment ring in the operational configuration bears radially.

8. The thermostatic cartridge according to claim 7, wherein the bearing surface is bordered by a shoulder an outer diameter of which is greater than a diameter of the inner face of the adjustment ring in the operational configuration, so that the shoulder axially retains the adjustment ring in the operational configuration around the outer face of the bearing surface.

9. The thermostatic cartridge according to claim 7, wherein the bearing surface comprises bearing elements, which are arranged on the outer face of the bearing surface, distributed in the direction peripheral to the axis and each projecting radially from the rest of the bearing surface, and wherein the adjustment ring is provided with a cylindrical surface on the inner face thereof, which has a circular base, when the adjustment ring is in the operational configuration, being centered on the axis and rests radially against the support elements.

10. The thermostatic cartridge according to claim 7, wherein the bearing surface also comprises a groove which is arranged on the outer surface of the bearing surface, running on this outer surface in the direction peripheral to the axis and being recessed relative to the rest of the bearing surface, and wherein the adjustment ring is provided, on the inner face thereof, with a bulge which, when the adjustment ring is in the operational configuration, is complementary to the groove and snaps into this groove.

11. The thermostatic cartridge according to claim 10, wherein the groove is flat bottomed.

* * * * *